United States Patent [19]

Zawodny et al.

[11] Patent Number: 4,492,446
[45] Date of Patent: Jan. 8, 1985

[54] CAMERA HAVING FILM FEED INDICATOR

[75] Inventors: Arthur Zawodny, Budd Lake; Jerzy Krysicki, Passaic, both of N.J.

[73] Assignee: Keystone Camera Corporation, Clifton, N.J.

[21] Appl. No.: 486,397

[22] Filed: Apr. 19, 1983

[51] Int. Cl.³ .......................... G03B 1/00; G03B 17/18
[52] U.S. Cl. .................................. 354/215; 354/289.1
[58] Field of Search .................. 354/212, 215, 289.1, 354/202

[56] References Cited

U.S. PATENT DOCUMENTS

| 3,688,668 | 9/1972 | Ort | 354/212 |
| 4,134,657 | 1/1979 | Nomura | 354/212 |
| 4,334,753 | 6/1982 | Harvey | 354/212 |

Primary Examiner—A. A. Mathews
Attorney, Agent, or Firm—Neuman, Williams, Anderson & Olson

[57] ABSTRACT

A camera is disclosed which has a film feed indicator in the form of a member which is disposed behind openings in a wall of a door and which is connected to a pawl engageable in a film aperture to be moved to a latched condition by an initial advance of the film. The indicator is released from the latched condition when the door is opened.

9 Claims, 8 Drawing Figures

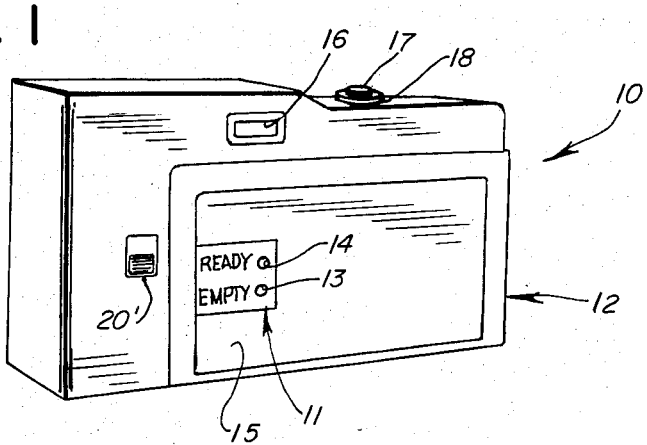
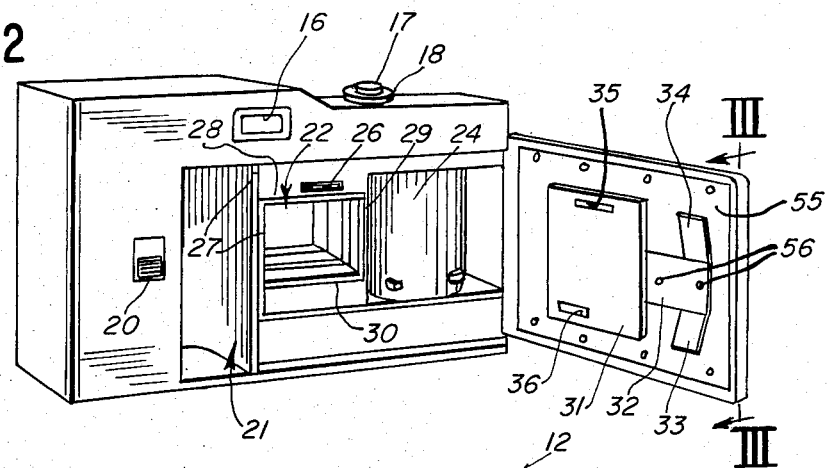
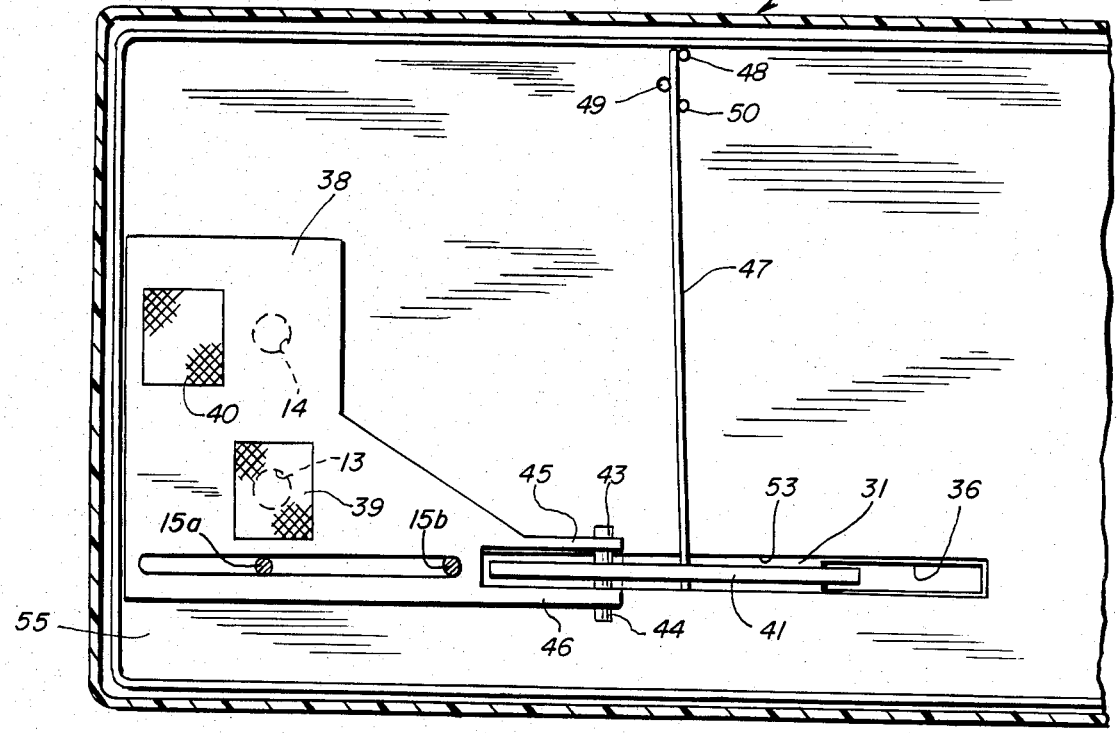

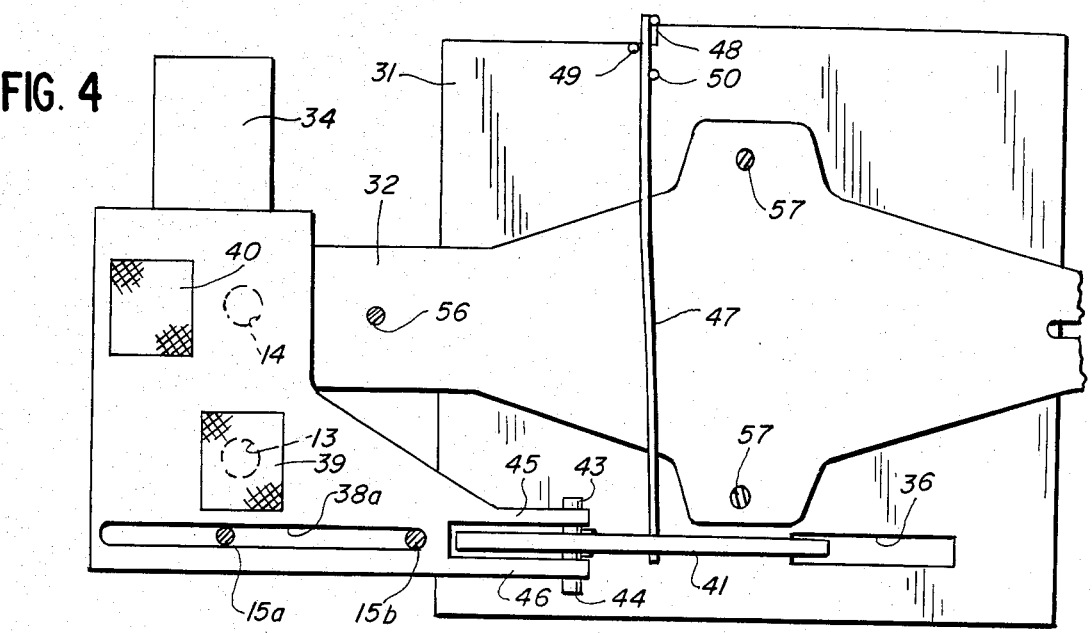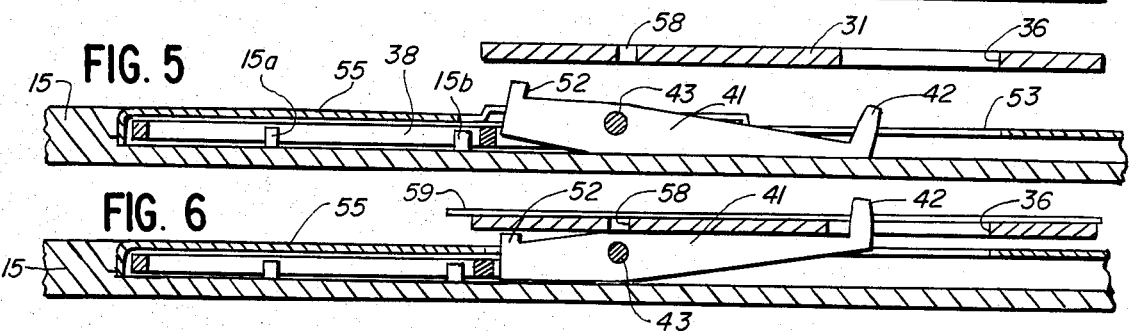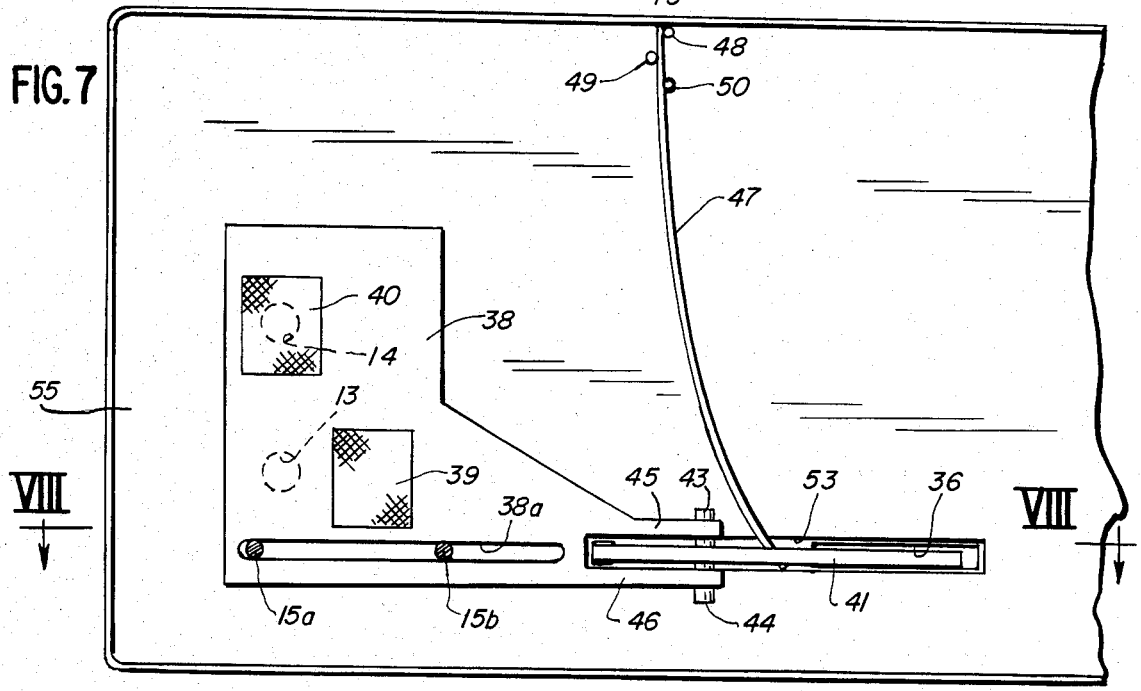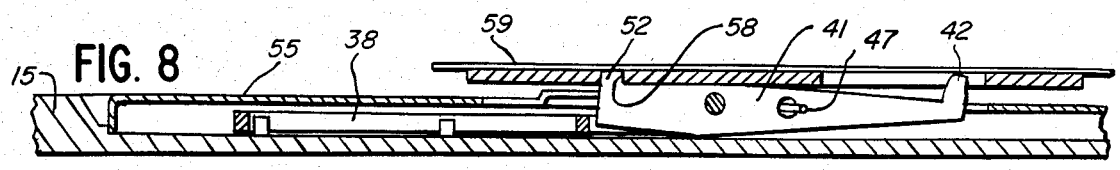

CAMERA HAVING FILM FEED INDICATOR

This invention relates to a camera having a film feed indicator and more particularly to a camera having a film feed indicator which clearly indicates whether or not the camera is ready for operation without introducing any complexity in the operation of the camera. The indicator is comparatively simple in construction and operation, uses a small number of inexpensive parts which can be readily assembled and, at the same time, it is highly reliable in operation.

BACKGROUND OF THE INVENTION

Various types of indicating arrangements have been used or proposed for use with cameras, for the purpose of insuring proper operation thereof. Such arrangements have included devices for permitting a user to determine by feel or by looking at a movable indicator whether or not film is being moved while he or she rotates a drive knob; devices for indicating movement of a supply spool while it is occurring; devices for indicating the completion of the advance of each frame of film; devices for indicating the number of frames and film which have been exposed; devices requiring the advance of film before allowing operation of a shutter; and devices for indicating whether the film should be wound or whether the film has been advanced and is ready for exposure. Some of such indicating arrangements have been advantageous in certain types of cameras but, in general, they have been such as to introduce undue complexity and confusion in the operation of the camera, requiring that the camera user be quite attentive. Also, the indicator arrangements have generally required complex and expensive mechanisms which are not always reliable in operation.

SUMMARY OF THE INVENTION

This invention was evolved with the general object of simplifying the operation of a camera while insuring proper operation with a high degree of reliability and, at the same time, permitting the camera to be economically manufactured.

An important aspect of the invention is in the recognition that one of the primary problems involved in the use of a camera is in insuring that the film has been properly installed in the camera with a leader section of the film properly engaged with the take-up spool. Once the film has been properly installed and attached to the take-up spool, it is very unlikely in most cases that there will be any subsequent problem in the operation of the camera and any indicator that requires continual attention tends to be confusing and counterproductive.

A further aspect of the invention is in the recognition that the proper attachment of the film to the take-up spool can be determined by determining whether there is an advance of the film when the take-up means is initially operated.

In a camera constructed in accordance with the invention, a comparatively simple arrangement is provided including actuating means responsive to initial movement of film by the film take-up means to operate indicating means from a first condition to a second condition. In accordance with a specific feature, the indicating means includes an element mounted for movement behind a portion of a housing wall having at least one opening therein, with a visible mark on the indicating member alignable with the opening. Preferably, two openings are provided adjacent one another with clearly understandable indicia opposite the two openings such as "READY" and "EMPTY".

Additional important features of the invention relate to the actuating means for the indicator, preferably including a pawl engageable in an aperture of the film to be positively moved when the film is advanced. A carrier member is associated with the pawl and latching means are provided for latching the carrier member in a position to which it is moved after proper initial advance of the film. The carrier member is preferably coupled directly to a movable indicator member and is spring urged in a manner such as to insure proper drive through the pawl while also insuring proper latching operation.

Further important features of the invention relate to the mounting of the indicating and actuating means on a door at the back of the camera and to an arrangement such that the indicating means are reset only when the door of the camera is moved to an open position for allowing removal of a supply spool from the camera, after rewind of the film.

This invention contemplates other objects, features and advantages which will become more fully apparent from the following description taken in conjunction with the accompanying drawings:

BRIEF DESCRIPTION OF THE DRAWINGS

FIG. 1 is a rear perspective view of a camera incorporating a film feed indicator of the invention;

FIG. 2 is a perspective view similar to FIG. 1 but illustrating the camera with a door thereof in an open position;

FIG. 3 is a sectional view taken from a plane just inside a rear wall of the camera door, as indicated by line III—III in FIG. 2, showing features of the indicator of the invention;

FIG. 4 is a view similar to FIG. 3, but showing a pressure plate and associated parts as they would appear if a cover plate were removed or not visible;

FIG. 5 is a sectional view taken substantially along line V—V of FIG. 3, the parts being shown in a condition in which the door is open, as in FIG. 2;

FIG. 6 is a sectional view similar to FIG. 5 but showing the parts in a condition in which the door is closed with film in the camera, but prior to an initial advance of the film;

FIG. 7 is a view similar to FIG. 3 but showing the parts in a condition after an initial advance of the film; and FIG. 8 is a sectional view taken substantially along line VIII—VIII of FIG. 7.

DESCRIPTION OF A PREFERRED EMBODIMENT

Reference numeral 10 generally designates a camera including a film feed indicator constructed in accordance with the invention. To operate the camera, the user checks the condition of a visible indicator generally designated by reference numeral 11, provided on a door 12 on the back of the camera. The indicator 11 includes two windows or openings 13 and 14 which are provided in a rear wall 15 of the door 12. A color which contrasts with that of the rear wall 15 will be clearly visible through one or the other of the openings 13 and 14. If it is visible through the opening 13, it shows that the camera is empty with no film properly loaded in the camera. If the color appears through the opening 14, it indicates that the camera is ready for operation.

By way of example, the rear wall 15 of the camera door 12 may be of a black plastic material and the color which is visible through one or the other of the openings 13 or 14 may be a light blue color. As shown, readily understandable indicia such as "EMPTY" and "READY" may be placed on the wall 15, adjacent the openings 13 and 14.

If the indicating color appears through the opening 14, showing that the camera is ready for operation, the user may simply proceed with the taking of photographs, looking through a viewfinder 16 and pressing a shutter release button 17, releasing a shutter lock lever 18, if necessary. The camera 10 may include an automatic motor drive film advance and an automatic film rewind, but it will be understood that the film feed indicator of the invention may be used with cameras using a manual film advance and rewind.

If the indicating color is visible through the opening 13, showing that the camera is empty, the user may open the film compartment door 12 by sliding up a door latch 20 and then swinging the door 12 out to a position such as shown in FIG. 2.

The user then inserts a roll or magazine of film in a film chamber 21, grabs the leader of the film and lays it flat across the rear end of a film compartment or exposure chamber 22, with the edge of the leader resting on a take-up spool 24 in a position such that projecting lugs 25 on the take-up spool 24 may engage perforations along one edge of the leader of the film. The user then closes the door 12, at which time the indicating color remains visible through the opening 13. The user then operates the film advancing mechanism until the indicating color becomes visible through the opening 14 to indicate that the camera is ready for taking of a photograph. With a camera having an automatic motor drive film advance mechanism, the film advance may be accomplished by depressing the shutter release button 17, after first operating the lock control 18 to a lock release position, if necessary. With a camera having a manual film advance, the film advance is, of course, performed manually in the usual way.

If after a number of operations of the film advance mechanism, the indicating color does not appear through the opening 14, the door 12 may be opened by sliding up the latch 20 and the condition of the film leader may be examined and adjusted to make sure that it is engaged with the take-up spool 24.

The mechanism for operating the take-up spool 24 is not illustrated since it is not critical to the invention; it may include means for operating a sprocket wheel 26 engaged with an upper edge of the film. It will be understood that a conventional lens and shutter are provided at the forward end of the exposure chamber 22. As shown, surfaces 27, 28, 29 and 30 are provided at the rear end of the exposure chamber 22 to provide a film support which supports the periphery of a section of film for exposure of a frame thereof. The film is pressed against the surfaces 27-30 by a pressure plate 31 which is carried from the door 12 by means of a member 32 of resilient sheet steel, having a pair of arms 33 and 34 for engaging and holding a magazine in the chamber 21.

As shown in FIG. 2, the pressure plate 31 has a slot 35 for providing clearance for the sprocket wheel 26 and an additional slot 36 along its lower edge. A pawl of an indicator actuating mechanism is arranged to extend through the slot 36 and into a position for engagement with apertures in the film, the indicator actuator mechanism being incorporated within the door 12.

FIG. 3 is a sectional view taken from a plane just inside the front surface of the rear wall 15 of the door 12, looking forwardly. An indicator 38 is provided which is in the form of a plate having a slot 38a which receives a pair of pins 15a and 15b projecting forwardly from the rear wall 15 of the door 12, to guide the indicator 38 for rectilinear movement.

Indicator 38 has two rectangular areas 39 and 40 thereon, formed or coated with a suitable indicating color such as a light blue color, as mentioned above. The positions of the openings 13 and 14 are indicated by broken lines in FIGS. 3 and 7.

In the position of the indicator 38, as shown in FIG. 3, the area 39 is aligned with the opening 13. When the indicator plate 38 is moved to the right, to a position as shown in FIG. 7, the area 40 is aligned with the opening 14. The indicator member 38 is moved from the position of FIG. 3 to the position of FIG. 7 by an initial forward advance of the film. It is actuated by means of a member 41 which is pivotally connected thereto and which carries a pawl 42 at its right-hand end which is its forward end in the direction of film advance. As hereinafter described, pawl 42 may be engaged in an aperture in the film to be moved forwardly, to the right, by the forward advance of the film.

To pivotally connect the member 41 to the indicator 38, member 41 is formed with a pair of integral pin portions 43 and 44 projecting in axial alignment from opposite sides thereof and engaged in bearings formed on the front sides of a pair of projecting portions 45 and 46 of the indicator 38. A spring wire 47 is provided, the upper end thereof being secured in place by being snapped between projections 48, 49 and 50 formed integrally on the front surface of the rear wall 15 of the door 12. The lower end of the wire 47 is engaged in an opening in the member 41.

The wire 47 performs two functions. One function is to urge the member 41 and the indicator 38 connected thereto in a rearward direction to the left as viewed in FIG. 3, opposite the forward direction of film advance.

The other function of wire 47 is to urge the member 41 in a clockwise direction, as viewed in FIGS. 5, 6 and 8, for latching of the indicator 38 and also to withdraw the pawl 42 from a film aperture after an initial advance of the film. Latching of the indicator 38 is performed by a projecting tail portion 52 on the member 41, at the end of the member 41 opposite that which carries the pawl 42. The pawl 42 and projection 52 extend through an opening 53 in a cover plate 55 which is secured on the front side of the door 12. The spring member 32 is secured to the front side of the cover 55 by suitable fastening elements 56, and is secured to the pressure plate 31 by fastening elements 57.

FIG. 4 shows the relationship of the pressure plate 31 and the support spring 32 to the indicator actuating mechanism, FIG. 4 being a view similar to FIG. 3 but showing the parts as they would appear with the cover plate 55 invisible or removed. The pressure plate 31 has the elongated slot 36 in alignment with the pawl 42 and in addition has an opening 58 which is in alignment with the projection 52 only when the member 41 has been moved to the right in the film advance direction. As a consequence, when the door 12 is initially closed, in a position as shown in FIG. 6, the pressure plate 31 engages film 59 and the projection 52 is engaged by the rear face of the pressure plate 31 and is held in a position as illustrated in which the pawl 42 projects toward the front of the camera for engagement into a film aperture. When the film 59 is then advanced, the member 41 and the indicator 38 are moved to the right until reaching the condition shown in FIGS. 7 and 8 in which the projection 52 is moved into the opening 58, a clockwise torque being applied to the member 41 by the spring wire 47. At this time, the pawl 42 is withdrawn from the film aperture and the member 41 and indicator 38 are held against movement back to the left, by engagement of the projection 52 in the opening 58.

The parts remain in the positions as illustrated in FIGS. 7 and 8 until the door 12 is opened which normally takes place after all photographs have been taken and the film has been rewound back to the film magazine. When the door 12 is opened, the pressure plate 31 is moved away by the spring 32, releasing the projection 52 and allowing the spring wire 47 to move the member 41 and indicator 38 back to the positions of FIGS. 3, 4 and 5.

It will be understood that modifications and variations may be effected without departing from the spirit and scope of the novel concepts of the invention.

We claim:

1. In a camera including housing means defining an exposure chamber, lens means at one end of said exposure chamber, a film support at the opposite end of said exposure chamber to support the periphery of a section of film for exposure of a frame thereof, film supply spool receiving means, film take-up means for engaging a perforation of a leader of a film of a supply spool in said receiving means and for advancing said film from said supply spool to position frame sections of said film seriatim at said film support for exposure thereof, indicating means operable between a first condition indicating that film is not properly threaded and a second condition indicating that film is properly threaded and that a section of film is engaged with said film support and ready for exposure, actuating means responsive to proper initial movement of film by said film take-up means to operate said indicating means from said first condition to said second condition, said actuating means being arranged to maintain said indicating means in said second condition until after exposure of frame sections of said film, and a door movable from a closed position to an open position for access to said supply spool receiving means and said take-up means, said actuating means being arranged to operate said indicating means from said second condition to said first condition upon movement of said door from said closed position to said open position.

2. In a camera as defined in claim 1, said indicating means being mounted on said door.

3. In a camera including housing means defining an exposure chamber, lens means at one end of said exposure chamber, a film support at the opposite end of said exposure chamber to support the periphery of a section of film for exposure of a frame thereof, film supply spool receiving means, film take-up means for engaging a perforation of a leader of a film of a supply spool in said receiving means and for advancing said film from said supply spool to position frame sections of said film seriatim at said film support for exposure thereof, indicating means operable between a first condition indicating that film is not properly threaded and a second condition indicating that film is properly threaded and that a section of film is engaged with said film support and ready for exposure, and actuating means responsive to proper initial movement of film by said film take-up means to operate said indicating means from said first condition to said second condition, said actuating means comprising engagement means movable by the film during said proper initial movement thereof, said engagement means comprising a pawl movable into a film aperture to be positively driven by the film, a carrier member carrying said pawl to be moved from a first position during said initial movement of the film, and latch means for latching said carrier member in said second position.

4. In a camera as defined in claim 3, said latch means comprising an element having a latch surface portion facing in a direction opposite the direction of advancing movement of the film, and projection means on said carrier member engageable with said latch surface portion in said second position of said carrier member.

5. In a camera as defined in claim 4, spring biasing means operative on said carrier member to move said projection means into engagement with said latch surface portion in said second position of said carrier member.

6. In a camera as defined in claim 5, said pawl being moved out of the path of the film upon movement of said projection means into engagement with said latch surface portion.

7. In a camera as defined in claim 6, said pawl and said projection means being at opposite ends of said carrier member, and means pivotally supporting an intermediate portion of said carrier member for movement thereof about a pivot axis generally transverse to the direction of movement of the film.

8. In a camera as defined in claim 3, including a door movable from a closed position to an open position for access to said supply spool receiving means and said take-up means, and a pressure plate resiliently supported on said door for urging the film into engagement with said film support, said carrier member being supported on said back, and said pressure plate having an opening through which said pawl extends for movement into a perforation of the film.

9. In a camera including housing means defining an exposure chamber, lens means at one end of said exposure chamber, a film support at the opposite end of said exposure chamber to support the periphery of a section of film for exposure of a frame thereof, film supply spool receiving means, film take-up means for engaging a perforation of a leader of a film of a supply spool in said receiving means and for advancing said film from said supply spool to position frame sections of said film seriatim at said film support for exposure thereof, indicating means operable between a first condition indicating that film is not properly threaded and a second condition indicating that film is properly threaded and that a section of film is engaged with said film support and ready for exposure, actuating means responsive to proper initial movement of film by said film take-up means to operate said indicating means from said first condition to said second condition, said indicating means comprising and indicating member movable from a first position to a second position, said indicating means further comprising a housing wall portion having an opening therein, and visible signaling means on said indicating member aligned with and visible through said opening only in one of said first and second positions, said indicating means further comprising a second opening in said housing wall portion, and second visible signaling means on said indicating member aligned with and visible through said second opening only in the other of said first and second positions of said indicating member.

* * * * *